United States Patent
Smith, III et al.

(10) Patent No.: US 6,339,813 B1
(45) Date of Patent: Jan. 15, 2002

(54) MEMORY SYSTEM FOR PERMITTING SIMULTANEOUS PROCESSOR ACCESS TO A CACHE LINE AND SUB-CACHE LINE SECTORS FILL AND WRITEBACK TO A SYSTEM MEMORY

(75) Inventors: Thomas Basil Smith, III, Wilton, CT (US); Robert Brett Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,702

(22) Filed: Jan. 7, 2000

(51) Int. Cl.$^7$ .......................... G06F 13/14; G06F 12/12
(52) U.S. Cl. ...................... 711/144; 711/133; 711/143; 711/145; 711/150; 711/155; 711/156; 711/168; 711/210
(58) Field of Search ................... 711/145, 144, 711/143, 141, 155, 150, 151, 156, 168, 118, 158, 159, 167, 3, 133, 210, 135, 154

(56) References Cited

U.S. PATENT DOCUMENTS

| | | | | |
|---|---|---|---|---|
| 4,493,026 A | * | 1/1985 | Olnowich | 711/128 |
| 4,797,814 A | * | 1/1989 | Brenza | 711/3 |
| 5,781,926 A | | 7/1998 | Gaskins et al. | 711/145 |
| 5,784,590 A | * | 7/1998 | Cohen et al. | 711/122 |
| 5,802,572 A | * | 9/1998 | Patel et al. | 711/143 |
| 5,835,929 A | * | 11/1998 | Gaskins et al. | 711/3 |
| 5,897,655 A | * | 4/1999 | Mallick | 711/134 |
| 6,065,091 A | * | 5/2000 | Green | 711/3 |
| 6,115,794 A | * | 9/2000 | Arimilli et al. | 711/141 |
| 6,119,205 A | * | 9/2000 | Wicki et al. | 711/143 |

OTHER PUBLICATIONS

"Processor Cache Sector Invalidate Signal on a Processor Bus", IBM Technical Disclosure Bulletin, May 1994, Volume No.: 37, Issue No.: 5, Page No.: 553–554, May, 1994.*
Jim Handy,, "The Cache Memory Handbook", Academic Press, TK7895.M4H35, 1993, pp. 47–91.*

* cited by examiner

Primary Examiner—Hong Kim
(74) Attorney, Agent, or Firm—Scully, Scott, Murphy & Presser; Robert P. Tassinari, Esq.

(57) ABSTRACT

In a cache memory system, a mechanism enabling two logical cache lines to coexist within the same physical cache line, during line fill and replacement, thus minimizing the likelihood of stalling accesses to the cache while the line is being filled or replaced. A control mechanism governs access to the cache line and tracks which sub-cache line units contain old or new data, or are empty during the fill/replacement procedure. The control mechanism thus maintains a sub-cache line state for the purpose of permitting a processor to gain access to a portion of the cache line before it is completely filled or replaced.

26 Claims, 6 Drawing Sheets

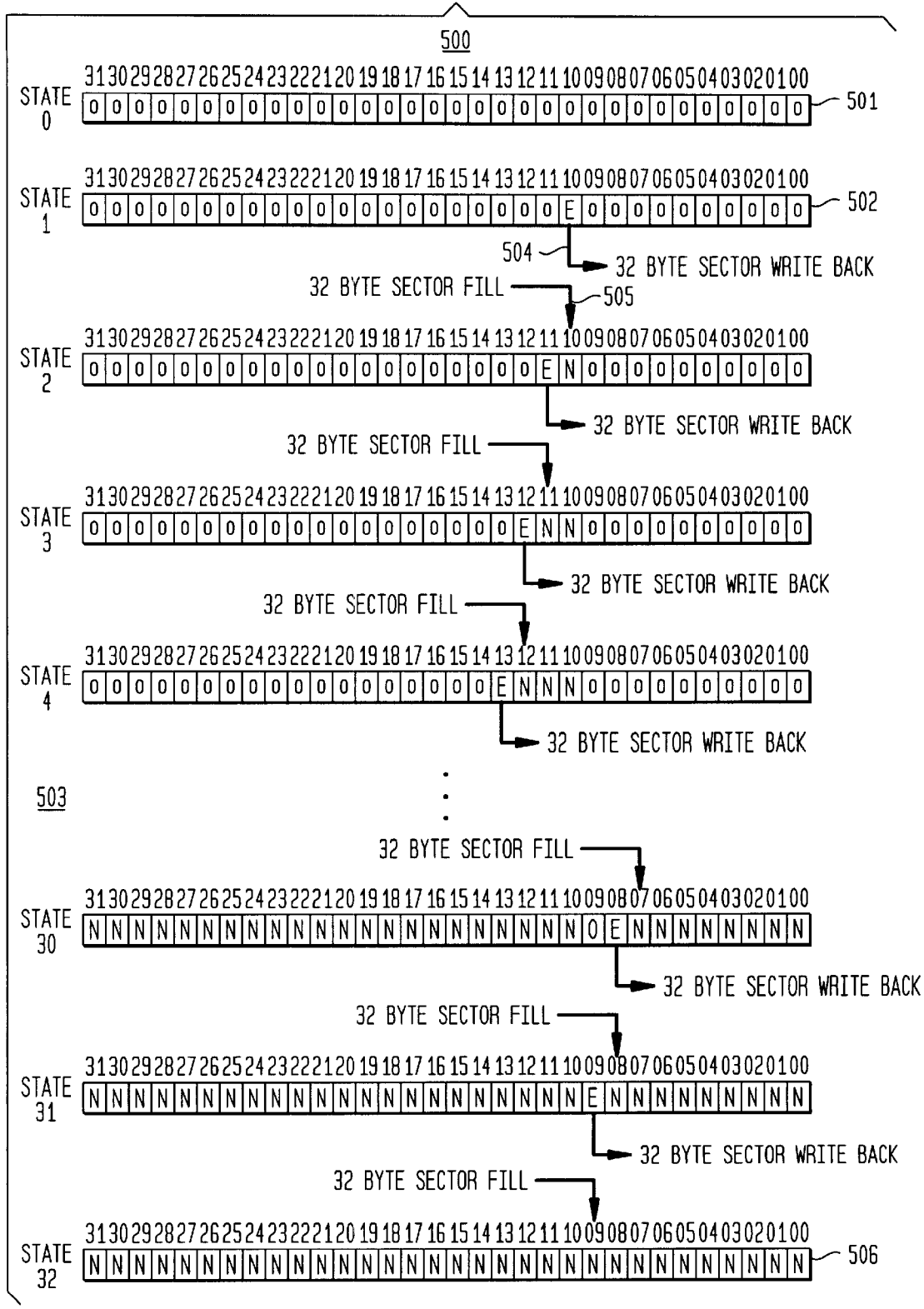

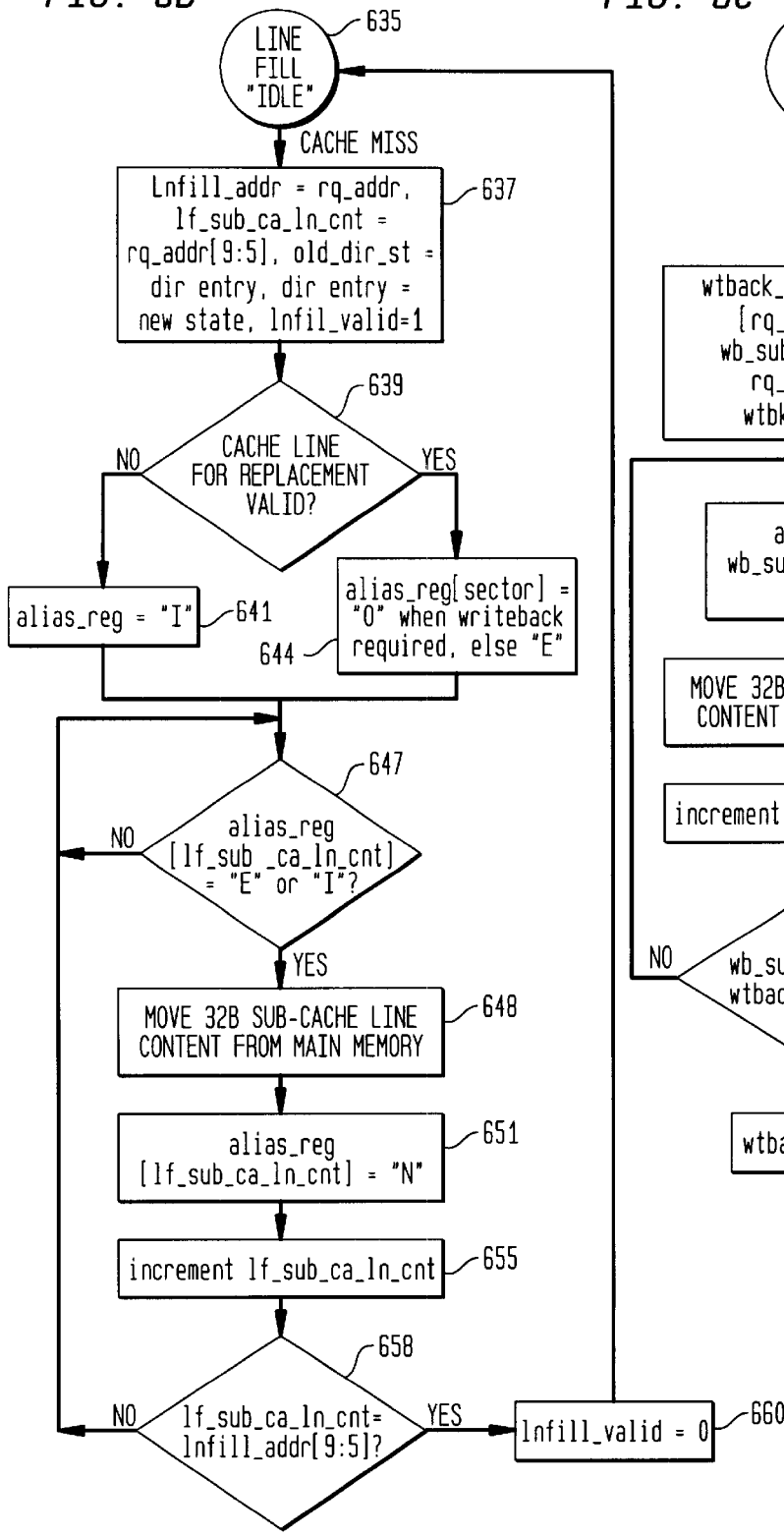
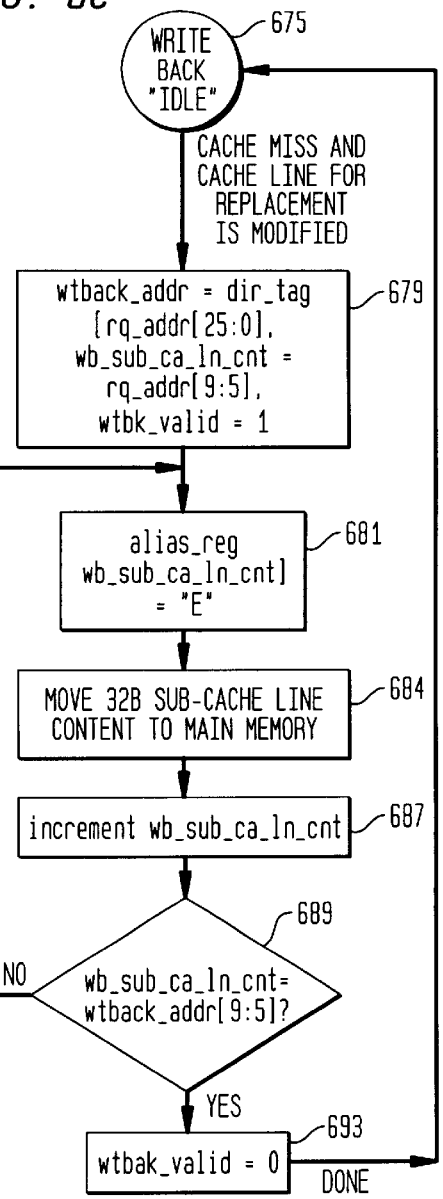
FIG. 6B
FIG. 6C

MEMORY SYSTEM FOR PERMITTING SIMULTANEOUS PROCESSOR ACCESS TO A CACHE LINE AND SUB-CACHE LINE SECTORS FILL AND WRITEBACK TO A SYSTEM MEMORY

BACKGROUND OF THE INVENTION

1. Field of the Invention

This invention relates generally to the field of cache memory in computer systems, and more specifically to an improved method and apparatus for managing the access of cache lines during cache line replacement.

2. Discussion of the Prior Art

Computer systems generally consist of one or more processors that execute program instructions stored within a memory medium. This medium is most often constructed of the lowest cost per bit, yet slowest storage technology. To increase the processor performance, a higher speed, yet smaller and more costly memory, known as a cache memory, is placed between the processor and final storage to provide temporary storage of recent/and or frequently referenced information. As the difference between processor speed and access time of the final storage increases, more levels of cache memory are provided, each level backing the previous level to form a storage hierarchy. Each level of the cache is managed to maintain the information most useful to the processor. Often more than one cache memory will be employed at the same hierarchy level, for example when an independent cache is employed for each processor.

Typically only large "mainframe" computers employ memory hierarchies greater than three levels. However, systems are now being created using commodity microprocessors that benefit greatly from a third level of cache in the memory hierarchy. This level is best suited between the processor bus and the main memory, and being shared by all processors and in some cases the I/O system too, it is called a shared cache. Each level of memory requires several times more storage than the level it backs to be performance effective. Thus, for example, the shared cache may require several tens of megabytes of memory. To remain cost effective, the shared cache is implemented using low cost Dynamic Random Access Memory (DRAM), yet at the highest performance available. This type of shared cache is typically accessed at a bandwidth that involves lengthy transfer periods, at least ten times that which is typical of other caches, to and from the main memory.

Cache memory systems in computing devices have evolved into quite varied and sophisticated structures, but always they address the tradeoff between speed and both cost and complexity, while functioning to make the most useful information available to a processor as efficiently as possible. Since a cache is smaller than the next level of memory in the hierarchy, it must be continuously updated to contain only information deemed useful to the processors.

FIG. 1 illustrates a block diagram of a conventional computer system 100 implementing a shared cache level memory. The system 100 is shown as including one or more processors 101 with level 1 102 and level 2 103 local caches forming a processor node 104, each connected to a common shared memory controller 105 that provides access to the a shared level 3 cache 106 and associated directory 116, and system main memory 107 representing the last level of a four level memory hierarchy. The cache control 108 is connected to the processor address bus 109 and to the data bus 110. The processor data bus is optimized and primarily used for transporting level 2 cache data lines between a level 2 cache and the level 3 111 and/or another level 2 cache 112. The main memory data bus 114 is optimized for, and primarily used for transporting level 3 cache data lines between the level 3 cache and the main memory 113. The level 3 cache data bus 115 is used for transporting both level 3 and level 2 data traffic, but is optimized for the level 2 cache data traffic. The level 3 cache 106 is both large and shared, and is typically constructed of the highest performance dynamic random access memory (DRAM) to provide enough storage to contain several times the collective storage of the local caches. The amount of main memory storage is typically over a thousand times that of the shared cache, and is implemented using inexpensive and often lower performance DRAM with processor access latencies much longer that the shared cache.

The processors 101 request read or write access to information stored in the nearest caches 102, 103 through a local independent address and data bus (not shown) within the processor node 104. If the information is not available in those caches, then the access request is attempted on the processor's independent address and data busses 109, 110. The shared memory controller 105 and other processor nodes 104' detect and receive the request address along with other state information from the bus, and present the address to their respective cache directories. If the requested data is found within one of the neighboring processor nodes 104', then that node may notify the devices on the bus of the condition and forward the information to the requesting processor directly without involving the shared cache any further. Without such notification, the shared memory controller 105 L3 cache controller 108 will simultaneously address the shared cache directory 116 and present the DRAM row address cycle on the cache address bus 117 according to the DRAM protocol. In the next cycle, the directory contents are compared to the request address tag, and if equal and the cache line is valid (cache hit), then the DRAM column address cycle is driven on the cache address bus 117 the following cycle to read or write access the cache line information. The shared memory controller 105 acknowledges processor read requests with the requested data in the case of a cache hit, otherwise the request is acknowledged to indicate retry or defer to the processor, implying that a cache miss occurred and the information will not be available for several cycles.

Referring to FIG. 2, there is illustrated a 4-way set associative 32 MB shared cache system 200 employing 1024-byte cache lines. The temporary information stored within the cache is constantly replaced with information deemed more valuable to the processor as its demands change. Therefore the cache array 201 is partitioned into an even number of storage units called lines 202. Each line is address mapped 203 to a group of equivalent sized ranges 208 within the main memory. A high speed directory 204 contains an entry 205, which is directly mapped to an index address 203 to each cache line and includes: a tag address 206 to keep track of which main memory range is associated with the cache line contents, in addition to independent bit(s) 207 to store state information pertaining to the line contents. The directory entries and cache lines mapped at a given index address are grouped in an associative set of four (4) to permit the storage of combinations of different tag addresses associated with the same index address 203. All four directory entries within a set are referenced in parallel for every processor request to determine which one of the four cache lines contains data for the request tag address.

When a processor requests information from an address within the main memory, the tag address stored within the mapped directory entries are compared by comparators 209 to the processor request address tag bits 208, and when equal and the state bit(s) 207 indicating the information is valid, it is said that the cache has been hit. Upon determination of the hit condition, the cached information is returned to the processor. If there was no match for the tag address or the cache line was invalid, then the cache information would be retrieved from the next lower memory level. When the information becomes available, it is passed on to the requesting processor, as well as stored in the cache 201 through a process called line fill. Often the cache line 202 is larger than the request information size, resulting in more information flow into the cache beyond that required to fulfill the request, and is called trailing line fill. Of course, if the cache was already full of valid information, then some existing information would have to be removed from the cache to make room for the new information through a process called line replacement. Cache line replacement involves either storing the new information over the existing information when the information is duplicated in a lower memory level or first removing the existing information and storing it back to a lower memory level through a process called line write back, because the information is not duplicated. In any case, a line fill always involves updating the associated directory entry with the new tag address and relevant state bits.

Generally, processor access to a line or even the whole cache is blocked during the period of time associated with processing a cache line fill and/or write back. Computer memory systems that employ caches partitioned into large cache lines that require lengthy periods to access the entire line may result in degraded performance when performing cache line fill and write back for replacement. This degradation occurs when processor requests for cache access are stalled when a cache line is busy with the trailing portion of either a replacement line fill or write-back. The severity of the problem is proportional to both the cache access bandwidth and to the likelihood that a processor will attempt an access to a cache line with a pending write back of line fill. Unfortunately, the likelihood of an attempted access to a pending large line fill with limited access bandwidth is quite high.

Often the process of replacing information within the cache results in periods where that processors are prohibited from accessing the cache or portions thereof. This situation is exacerbated as the length of time that a cache is busy performing information replacement. Therefore, the need has arisen for an improved method of information replacement when lengthy busy times are unavoidable, without significant cost or complexity.

Prior art schemes addressing this issue provides a solution for either facilitating rapid evacuation of the cache line contents into a write back buffer to make room for the line fill data and/or a solution to permit access to a portion of a cache line, without having to wait for a pending line fill to complete. Write back buffers however, do not mitigate the processor wait states for large cache line processing, because it is not economically feasible to provide enough bandwidth to evacuate the cache line fast enough to gain any benefit for this purpose.

Referring now to FIG. 3, there is shown a conventional technique for permitting access to sub-cache line data units once filled during a pending cache line fill following a cache miss. A line fill address register 301 is incorporated into the cache controller with a comparator 302, logic AND gate 303, multiplexer 304 and valid bits 305 connected via busses. When a processor request address fails to hit the cache, the request address is stored into the line fill address register 301. As sub-cache line information units are placed in the cache, corresponding valid bits within a valid state register 305 are set. Subsequent processor request addresses to access the cache line with pending fill are compared to the line fill address register and to the addressed sub-cache line valid bit to determine if the request can be serviced from valid sub-cache line data units, otherwise the request will be delayed unit the required data units are ready. In any case only one logical cache line may be referenced within the physical cache at any given time, as defined by the line fill address contained within the line fill register 301 and associative cache line selection within the indexed set. Sub-cache line access through the apparatus is only performed when a line fill is pending, as the apparatus is otherwise idle and unused.

U.S. Pat. No. 5,781,926 to Gaskins et al. describes such a system that permits partial cache line access during a line fill, however, it does not address the problem of lengthy delays associated with the write back before the line fill may commence. That is, the system described in Gaskin et al. does not permit write backs to occur simultaneously with line fills and processor requests in the cache line at the same time, i.e., it does not enable two cache lines to co-exist in the same cache line.

It would be highly desirable to provide a mechanism for permitting processor access to a cache line while it is being filled and/or emptied to main memory, thereby facilitating simultaneous storage and access to two separate logical cache lines within one physical cache line.

SUMMARY OF THE INVENTION

It is an object of the invention to provide a cache memory system that permits a processor access to a cache line while it is being filled and/or emptied to main memory, thereby facilitating simultaneous storage and access to two separate logical cache lines within one physical cache line.

It is another object of the invention to provide a cache memory system that enables cache line write backs to occur simultaneously with line fills and processor requests in the cache line at the same time, thus permitting two logical cache lines to coexist within the same physical cache line and minimizing the likelihood of stalling accesses to the large cache line while it is being filled or replaced.

Thus, according to the principles of the invention, there is provided, in a computer memory system including a processor device having associated system memory storage, and a cache memory array device having a plurality of cache lines, each cache line having a plurality of sub-cache line sectors for storing data; and, a cache line write back means, associated with said cache memory array, for performing a cache line fill operation by requesting and removing existing cache line data and replacing removed data with different data in a cache line write back operation, a method of permitting simultaneous access to sub-cache line sectors by the cache line write back means and the processor device, the method comprising the steps of tracking a sub-cache line sector replacement state for independent sub-cache line sector data; referencing the sub-cache line sector replacement state when one of a line fill operation and write back operation, or both, are pending; and, permitting processor access to each sub-cache line sector of the cache line having a sub-cache line sector replacement state indicating logically coherent information content.

Advantageously, such a method and apparatus of the invention is highly efficient and best suited to very large cache lines that are accessed at a bandwidth that requires many access cycles to complete a line fill or replacement. Cache lines with these attributes are often implemented in DRAM based memory with access bandwidth matched or optimized to an access granularity significantly smaller than the cache line size.

BRIEF DESCRIPTION OF THE DRAWINGS

Further features, aspects and advantages of the apparatus and methods of the present invention will become better understood with regard to the following description, appended claims, and accompanying drawings where:

FIG. 5 illustrates an example of the processing involving two cache lines occupying one physical cache line.

FIGS. 6 and 6(a)–6(c) illustrate respective state diagrams for the methods of cache line access and replacement according to the present invention.

DETAILED DESCRIPTION OF THE PREFERRED EMBODIMENT

Figure 1:
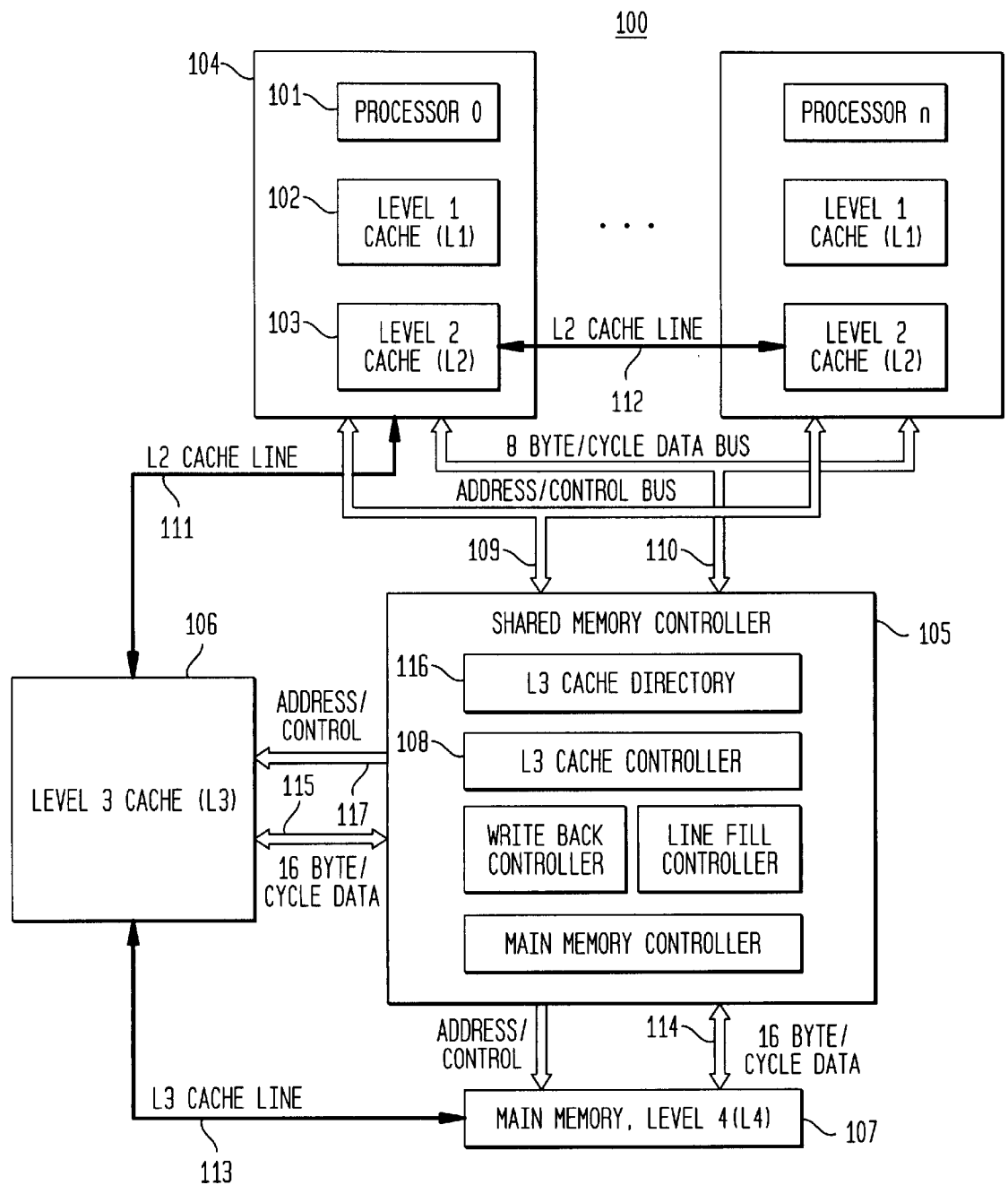
FIG. 1 illustrates a block diagram of a prior art computer having a cache memory system.
Figure 2:
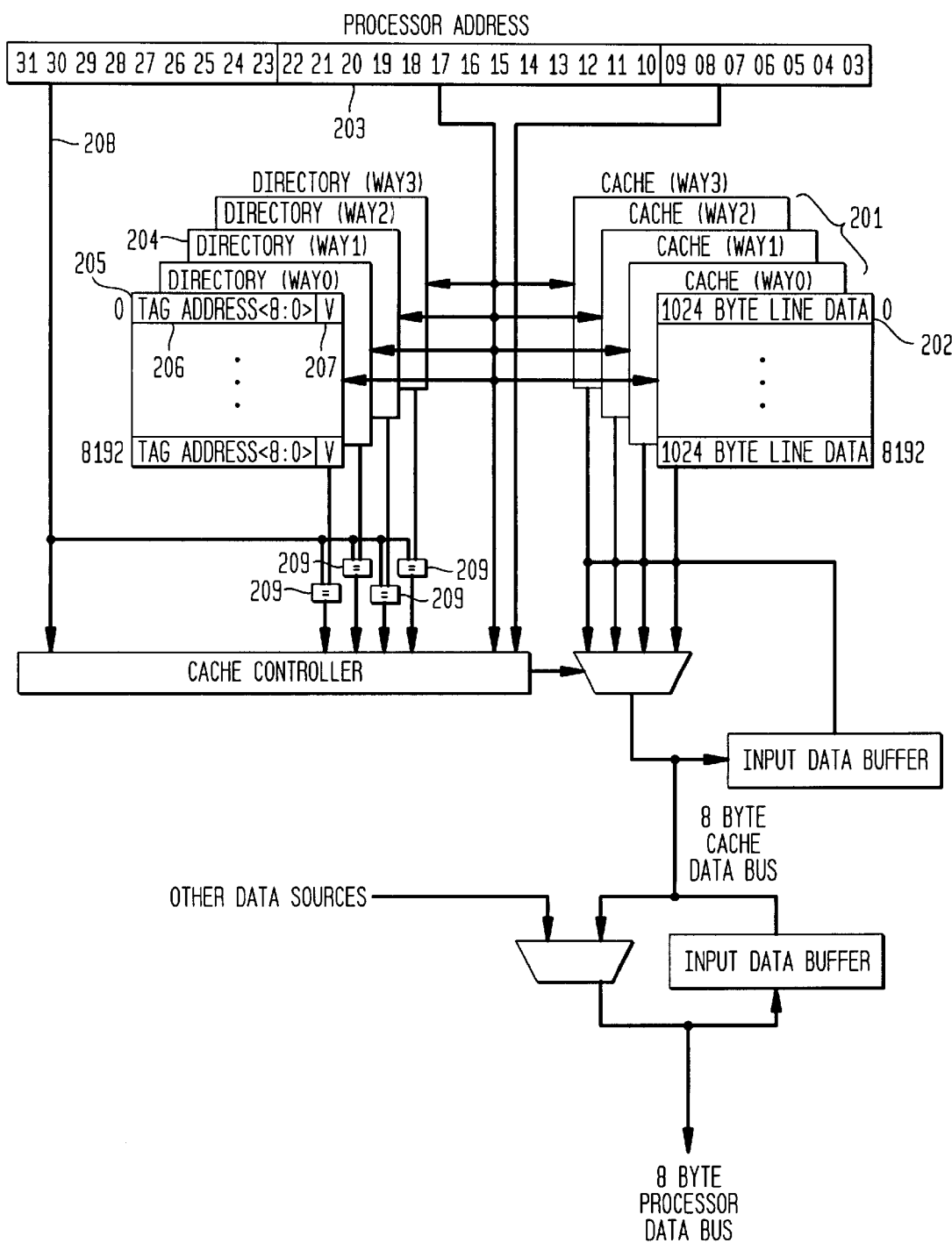
FIG. 2 illustrates a block diagram of a prior art computer cache memory and cache directory.
Figure 3:
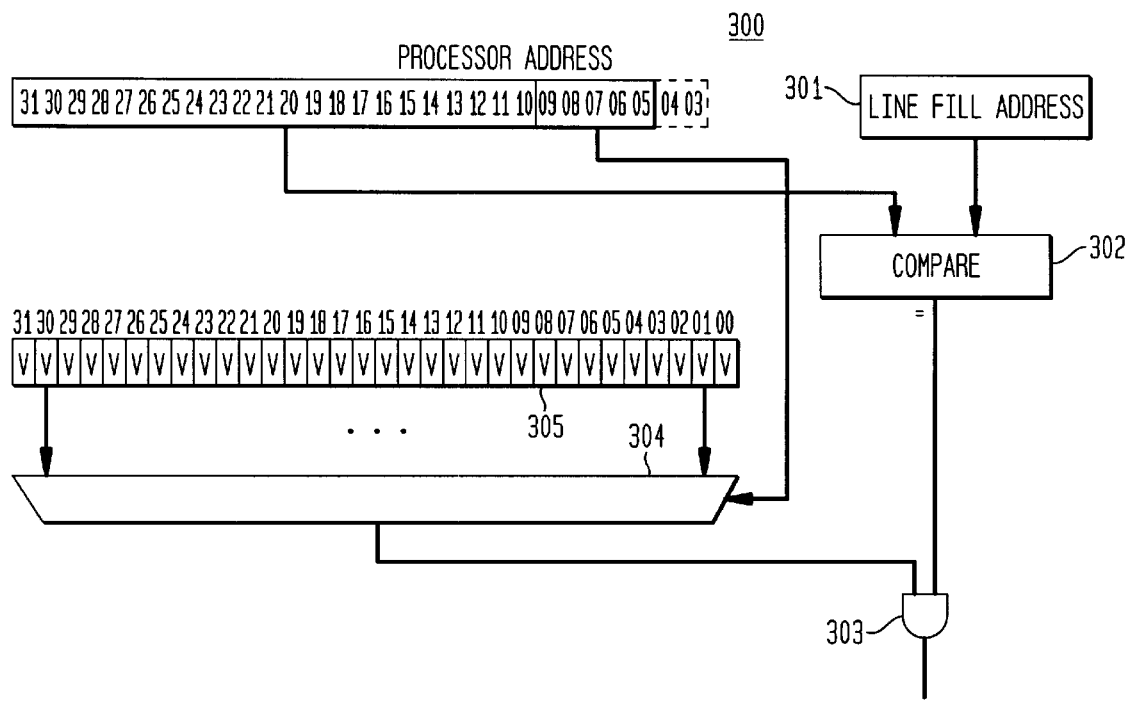
FIG. 3 illustrates a block diagram of a prior art computer cache employing sub-cache line access controls.
Figure 4:
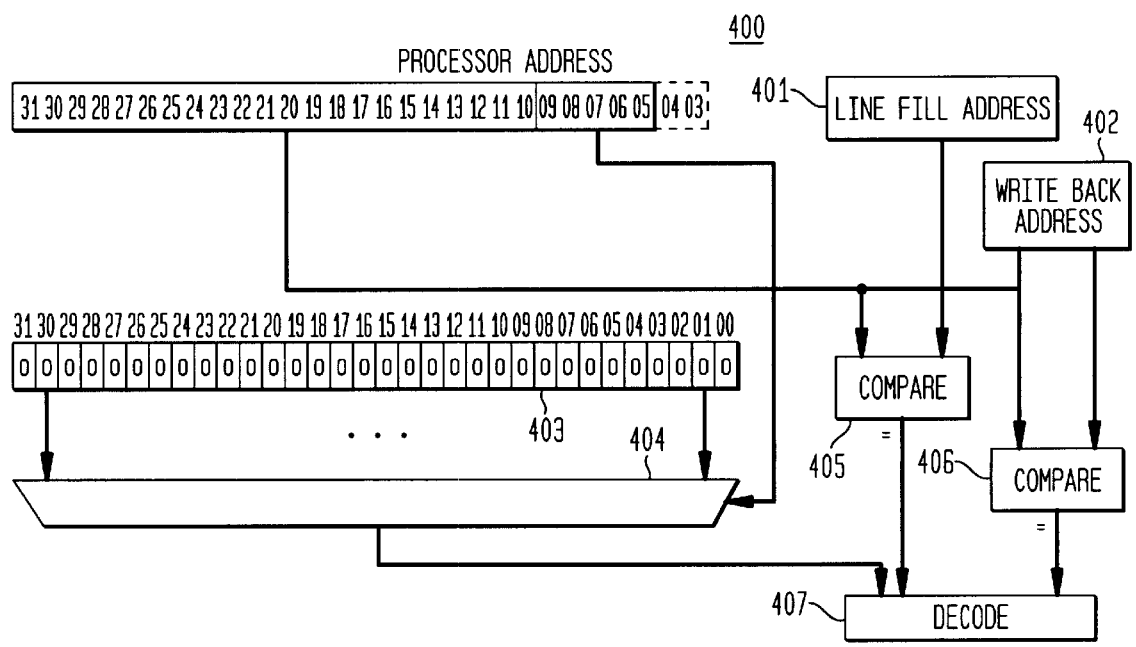
FIG. 4 illustrates a block diagram of an improved apparatus permitting two logical cache lines to occupy one physical cache line.

Referring to FIG. 4 an improved apparatus 400 is shown that permits two logical cache lines to be accessible within a physical cache line. With reference to the cache controller device 108 (FIG. 1), FIG. 4 illustrates incorporation of two address registers: a line fill address register 401; and, a write back address register 402. Each register 401, 402 identifies an independent cache line tag address that may have valid information contained within a given physical cache line. A cache line alias state register 403 contains an independent 2-bit state vector for each sub-cache line information unit. For illustrative purpose, an example is shown where a 1024 byte cache lines is logically partitioned into thirty two, 32-byte information units. The register 403 is only valid during an active cache line fill and/or replacement. The multiplexor ("mux") 404 gates the relevant sub-cache line state vector to the decoder 407 for a given processor request. In the preferred embodiment, the number of register sets, i.e., line fill address register 401, write back register 402, alias register 403 and associated multiplexor 404 and comparators 405 and 406, employed is equal to the number of cache lines that may be filled or replaced at a given time. When a cache line is initially targeted for fill or replacement, the cache line alias state register is validated and initialized with all sector states equal to the corresponding initial condition of cache line data units; either old (O) when the respective data sector must be written back to main memory, empty (E) when the data sector need not be written back to main memory or invalid (I) when the data sector is invalid. Thus, each 2-bit state vector will have a unique value for indicating either the old (O), empty (E) or invalid (I) data sector state. As sub-cache line information units are placed in (line fill) or removed from (write back) the physical cache line, corresponding state bits within a cache line alias state register 403 are updated. Subsequent processor request addresses to access the cache line with pending fill and or write back are compared to the line fill address register, write back address register and to the addressed sub-cache line state vector, selected by mux 404, to determine if the request can be serviced from valid sub-cache line data units, otherwise the request will be delayed until the required data units are ready.

Figure 6A:
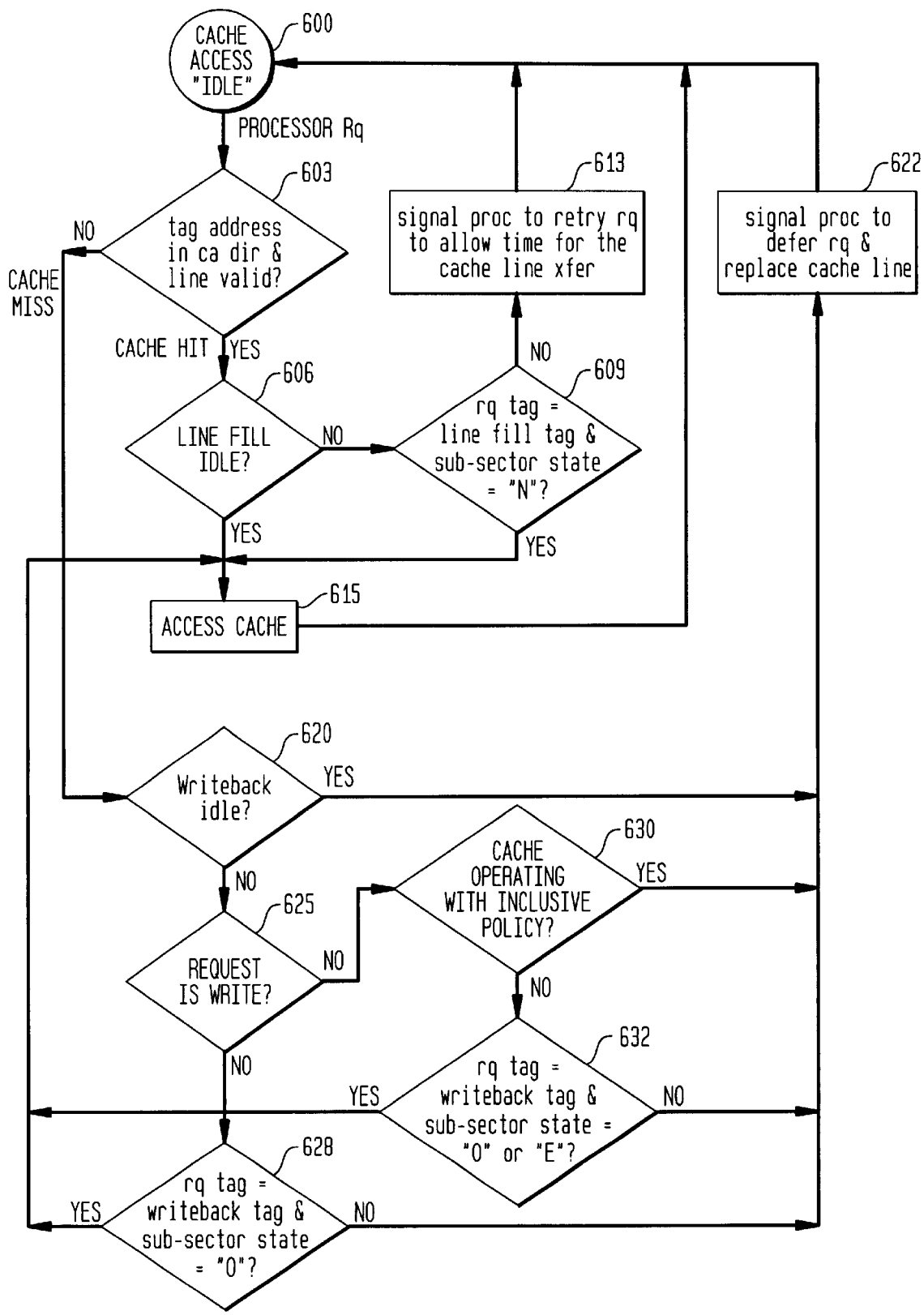

Referring now to FIGS. 6(a)–6(c), there is illustrated state diagrams 600, 635, 675 for the three independent processes that cooperate, using the aforementioned register set 400 (FIG. 4), for the purpose of permitting processor access to those portions of a cache line that are logically coherent for correct operation, while the cache line fill and/or write back operations are pending in the cache line. FIG. 6(a) illustrates the cache access request state diagram 600 for controlling access to the cache memory. FIG. 6(b) illustrates the line fill state diagram 635 for controlling the process of moving information from the main memory to the cache line after a cache miss and associated cache line replacement request; and, FIG. 6(c) illustrates the write back state diagram 675 for controlling the process of moving the contents of a cache line from the cache memory to the main memory after a cache miss and associated cache line replacement request.

With reference to FIG. 6(b), there is illustrated a flow 635 depicting the case of a processor that has requested data that is not available in the cache, i.e., a cache miss, and which line fill procedure is performed to make the data available from the lower memory. As depicted, the cache line fill is "idle" prior to a cache miss. At the time of a cache miss at 637 several variables are initialized: 1) "lnfill_addr" which is the line fill address and gets loaded with the processors request address; 2) a "ln_sub_ca_ln_cnt" which is the line fill sub cache line counter that gets loaded with a portion of the request address because that is keeping track of the X byte portions that have to be moved for the processor to access. In an example implementation, this variable will count for 32 times to get the thirty-two (32) 32 byte portions (e.g., in the case of a 1024 byte cache line) out of lower memory. Preferably, the initial value of this count loaded with the processor address because line filling must start with the critical word the processor needs first, i.e., counting is started at the particular data point that the processor requested; 3) "old_dir_st" is a variable that is provided with the contents of the cache directory entry and particularly the state of the cache line; 4) "dir entry" is the directory entry which is now re-loaded with a new cache line state, e.g., in effect, indicating start of cache-line replacement and corresponding directory update. This new state will have valid bits, new tag address, etc., for the cache directory entry; and 5) "lnfill_valid" is a flag indicating that the line fill is busy (not idle). For the next step 639, a decision is made as to whether the cache line that is to replaced (filled) was previously valid or not. At step 641, if the cache line was determined to be invalid, the alias register (403) content to "I". If the cache line was determined to be previously valid, the alias register (403) content is replaced with a content "O" for a given sector when a corresponding sector needs to be written back; otherwise, the register is initialized with an "E" indicating that the data is coherent with respect to the main memory, as indicated at step 644. The next step 647 is invoked to prevent information targeted for a write back from being overwritten with new line fill information before the write back operation has completed. That is, at step 647, a loop is entered until the alias register content for that sector indicates an E or I. Once vector bits indicating an E or I are asserted, then the first 32-bytes of sub-cache line content is moved from main memory to the cache line, as indicated at step 648. Consequently, as indicated at step 651, as the 32 byte data line is moved to the sub-cache line portion, the respective alias bit vector (403) is set to state "N" for New because new data is in the line. Then, at step 655, the "ln_sub_ca_ln_cnt" count is incremented by 1 so that it may point to the next data portion. Then, at step 658, a check is made check to see if the last 32 byte data has been filled, i.e., a determination is made as to whether the "ln_sub_ca_ln_cnt" count has been incremented to the point where it started, i.e., at the ln_fill addr. If it has not reached the end, i.e., cache line not filled, then the loop continues by repeating steps 647 through 658 until each of the remaining 32 byte portions have been moved. When, the last 32 byte portion has been moved, at step 658, then the lnfill_valid variable is set to indicate that the line fill is again idle (not busy) at step 660 and the process returns to the top indicating an idle line fill state.

With reference to FIG. 6(c), there is illustrated a flow 675 depicting the case of a processor that has requested data that is not available in the cache, i.e., a cache miss, however, which contains modified data that must be written back to lower memory, due to invalid or stale data corresponding to the cache line location in the memory. As depicted, the cache line write back is "idle" prior to a cache miss. At the time of a cache miss at 679 several variables are initialized: 1) "wrback_addr" which is the write back address and gets loaded with a concatenation of the directory tag that was in the cache directory which would represent the old line address and the request address from the processor; 2) a "wb_sub_ca_ln_cnt" which is the line fill sub cache line counter that gets loaded with a portion of the request address because that is keeping track of the X byte portions that have to be moved for the processor to access; and 3) "wrbk_valid" is a flag indicating that the write back is busy (not idle). For the next step 681, the alias register 403 at the sub_cach_ln_cnt is set to the E state, empty, implying the data may be legitimate, however, it has been written back to memory. Then, at step 684, the first 32-bytes of sub-cache line content is moved to main memory from the cache line. Then, at step 687, the "wb_sub_ca_ln_cnt" count is incremented by 1 so that it may point to the next data portion to be moved. Then, at step 689, a check is made check to see if the last 32 byte data has been written back, i.e., a determination is made as to whether the "wb_sub_ca_ln_cnt" count has been incremented to the point where it started, i.e., at the wrback_addr. If it has not reached the end, i.e., cache line not written back, then the loop continues by repeating steps 681 through 689 until each of the remaining 32 byte portions have been moved back to main memory. When, the last 32 byte portion has been moved, at step 693, then the wrbk_valid variable is set to indicate that the write back fill is again idle (not busy) at step 675 and the process returns to the top indicating an idle write back state.

FIG. 6(a) illustrates the cache access request state diagram 600 for controlling access to the cache memory. As shown at step 603, the first thing the processor does is to interrogate the cache directory and compare the cache address in the directory to the processor request address, and if the processor request is equal to the address and the cache line is valid then, then a typical cache hit results. As indicated at step 606, if a cache hit results, one or two things may happen depending upon the next decision point at step 606 which determines the state of the line fill. If the line fill is in the idle state, i.e., lnfill_valid set to 0 (FIG. 6(b)), then the processor (or other requesting process) may access the cache contents directly at step 615 and the process returns to cache access idle. If the lnfill_valid bit was set then the line fill process is busy (not idle) which means that the line fill process 635 (FIG. 6(b)) is being performed. It is then necessary to look at the line fill registers at the initialization and see if the line hit is being filled. Thus, at step 609, a comparison is made as to whether the request address equals the line fill address and the alias register is interrogated to determine whether or not that portion of the line may be accessed, i.e., the sub-sector state='N' for new. If the line fill was missed, i.e., the request address does not equal the line fill address, then nothing is done and the processor is directed to retry the request at step 613 at a later time to allow time for the cache line transfer. If the line fill was hit, i.e., the request address equals the line fill address and the alias register for that sub-sector indicates 'N' then that portion of the cache line may be accessed as indicated at step 615, i.e., that sub-sector has been filled.

Referring back to step 603, if the line was missed, then the process continues at step 620 which is a write back idle decision block that determines whether the write back is idle, i.e., wtbak_valid=0 (FIG. 6(c)). If the write back is in an idle state, then the process returns to step 622 to signal the processor to defer the transaction of the request, i.e., signal a cache miss, and would start the line fill and write back procedures. If the write back is busy, i.e., wtbak_valid=1, then there is some processing going on. Thus, at the next step 625, a decision is made as to whether the request is a write or a read. If it is a write, then the processor is pushing down some modified data itself from one of its caches. Under these circumstance, that data may be taken from the processor if the alias register sector is marked O. That is, at step 628, a decision is made as to whether the request address matches the write back address and the sector is "O" (its old) then the cache line is accessed and the processor write operation is performed (step 615). Otherwise, if the request address matches the write back address and the sector does not equal "O" the processor is signaled to defer the request (step 622). If, at step 625, it is determined that the processor request is a read, then the process continues at step 630 to determine if the cache is operating with an inclusive policy, i.e., in a cache hierarchy, whatever data is in the higher level cache must also be in the lower level cache. If the cache is operating according to an inclusive policy, then the process returns to step 622 to initiate the line fill and/or write back operations. If the cache is not operating according to an inclusive policy, then a decision is made at step 632 to determine whether the processor request address matches the write back address and whether the alias register sub-sector state is an "O" or an "E" (empty). If the processor request address matches the write back address and sub-sector state is an O or an E, then the cache may be accessed by the processor (or other requesting entity) at step 615. If the processor request address did not match the write back address or the sub-sector state is not an O or an E, then it is an ordinary miss and a standard cache miss operation is performed by returning to step 622.

Referring now to FIG. 5 there is shown a succession of cache line alias register states 500 as a 1024-byte cache line is both written back and filled beginning at sub_cache line information unit 10. Upon a processor cache miss and the selected cache line requires a write back to main memory, but before any cache information has been moved, all cache alias state register vectors are set to Old "O" 501. The cache line fill controller will begin retrieving the new cache line data from main memory (FIG. 6(b)) and if required (as in this case) and concurrently, the cache line write back controller will begin writing the cache line data back to main memory (FIG. 6(c)). Since the line is filled first with the data initially requested by the processor, resulting in a request specific sub-cache line information unit order, the write back controller begins unloading cache line information units in the same order, beginning with the first line fill information unit 502. This permits the procession of line fill sectors to generally arrive at the data cache when the sector is empty 503. As soon as a sector is removed from the cache, the corresponding cache line alias state register sector state bits are updated to empty (E) 504, reflecting that the sector data has been copied to the main memory or to an intermediate buffer. The line fill controller will store data sectors in to the data cache only when the corresponding cache line alias state register state is either invalid (I) or empty (E) 505.

When the cache line alias state register is valid, processor references to the cache must also be compared to the register content in addition to the write back, line fill and cache directory state. A processor is permitted to access any cache data sector with a corresponding cache line alias state equal to new (N). For certain applications and cache policies, the processor may also access cache data sectors with corresponding cache line sector alias state register sector state equal to old (O). After the last data sector is filled 506, the cache line alias state register in invalidated, the cache line is no longer shared and is handled in the typical manner that caches function.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computer memory system including a processor device having associated system memory storage, said computer memory system comprising:
   a cache memory array device having a plurality of cache lines, each said cache line having a plurality of sub-cache line sectors for storing data;
   a cache directory device, associated with said cache memory array device, comprising entries for storing address tag information associated with the data stored in said cache memory array;
   a cache line write back system, associated with said cache memory array, for performing a cache line fill operation by requesting and removing existing cache line data and replacing removed data with different data via a cache line write back operation, and updating said directory device with new address tag information; and
   a cache memory access system for enabling access to said data by said processing device, said cache memory access system including:
     a plurality of sub-cache line state vectors, each state vector corresponding to an associated sub-cache line sector within a cache line and indicating a state of data at said associated sub-cache line sector; and
     control means for receiving said address tag information and said plurality of sub-cache line state vectors and determining whether data requested by either one of said processing device and said cache line write back system is stored in said cache memory array and available for use by said one of said processing device and said cache line write back system,
   wherein said requested data is provided to one of said processing device and said cache line write back system when said cache line is not completely filled or emptied and
   wherein said cache memory access system enabling data to be simultaneously written to said sub-cache line sectors and data at said sub-cache line sectors to be read by one of said cache line write back system and said processor device or both.

2. The computer memory system as claimed in claim 1, wherein said cache line write back system iteratively transfers said requested data from said system memory to said sub-cache line sectors in predetermined byte lengths.

3. The computer memory system as claimed in claim 2, wherein said cache line write back system iteratively transfers said requested data from said sub-cache line sectors to said system memory in predetermined byte lengths prior to the cache line fill operation.

4. The computer memory system as claimed in claim 3, wherein the cache line is filled with data from said system memory in a deterministic order beginning with the data requested by the processor, said cache line data being emptied to said system memory in the same deterministic order beginning with data contained in the sub-cache line sectors intended to be filled first.

5. The computer memory system as claimed in claim 4, wherein said control means includes means for maintaining a cache line replacement control state including a pending write back active state bit set to indicate a pending write back operation and, a pending line fill active state bit set to indicate a pending cache line fill operation, said maintaining means for detecting when the pending write back operation has completed and updating said pending write back active state bit to indicate an idle write back operation and, detecting when the cache line fill operation has completed and updating said pending line fill active state bit to indicate an idle cache line fill operation.

6. The computer memory system as claimed in claim 5, wherein said control means includes comparator device for comparing a memory address associated with a processor read request with said address tag information of a cache directory entry, and when said requested address matches said address tag information and said cache line data is valid, said control means logically determines if said pending line fill active state bit is set, and enables processor access to said data at said cache line when said pending fill active state bit indicates the idle cache line fill operation.

7. The computer memory system as claimed in claim 6, wherein said control means further includes means for detecting each transfer of requested data from said system memory to a sub-cache line sector during the pending cache line fill operation, and updating each corresponding sub-cache line state vector to indicate new data filled relating to new cache directory tag address.

8. The computer memory system as claimed in claim 7, wherein when said requested address matches said address tag information and said pending line fill active state bit is set to indicate the pending cache line fill operation, said control means logically determines if a state of data at said sub-cache line sector indicates said new data, and enables processor access to said data at said cache line when said logical determination is true.

9. The computer memory system as claimed in claim 8, wherein said control means comprises:
   a cache line address tag address register set maintained for each pending cache line replacement and for storing address tag information of a processor request;
   a cache line fill address tag address register for storing said cache line fill address tag information; and
   a cache line write back address tag address register for storing said cache line write back address tag information.

10. The computer memory system as claimed in claim 7, wherein prior to the cache line fill operation, said control means further determining validity of current cache line data, and, if said cache line comprises invalid data, said detecting means updating said sub-cache line state vectors to indicate cache line sub sector data as invalid, and, if said cache line comprises valid data, said detecting means updating said sub-cache line state vectors to indicate corresponding data as either one of: data targeted to be written back to said system memory, and data having a corresponding copy in said system memory storage, wherein a transfer of requested data from said system memory to a sub-cache line sector is performed at a sub-sector location indicated as including either one of invalid sub-sector data or data having a corresponding copy in said system memory storage.

11. The computer memory system as claimed in claim 10, wherein said control means further includes means for detecting each transfer of requested data from a sub-cache line sector to said system memory during the pending cache write back operation, and updating each corresponding sub-cache line state vector to indicate sub cache line data has a corresponding copy in said system memory storage.

12. The computer memory system as claimed in claim 11, wherein when said requested address does not match said address tag information and said cache line data is valid, said control means logically determining if said pending write back active state bit is set to indicate the pending cache write back operation, and when said pending write back active state bit indicates idle status, said control means initiating performance of the cache line fill and write back operations for said cache line at said requested address, and deferring said processor read request.

13. The computer memory system as claimed in claim 12, wherein said control means further includes said comparator device for comparing a memory address associated with a processor write request with said address tag information of a cache directory entry, wherein if said pending write back active state bit is set to indicate the pending cache write back operation, and said processor request is a data write request and said requested address matches said write back address tag information, said control means logically determining if a state of data at a sub-cache line sector indicates data targeted to be written back to said system memory, and enabling access to said data at said cache line sub sector when said logical determination is true.

14. The computer memory system as claimed in claim 13, wherein when said computer memory system implements an inclusive cache coherence policy, said control means initiating performance of said cache line fill and cache line write back operations and deferring a processor request when said pending write back active state bit is set and said processor request is a read request.

15. The computer memory system as claimed in claim 14, wherein said computer memory system does not implement an inclusive cache coherence policy, said control means logically determining if said address tag information of a processor request matches write back address tag information of a cache line write back address tag, and a state of data at said sub-cache line sector indicates that said data is targeted for write back to said system memory or has a corresponding copy in said system memory, and said processor request is a read request, and, if said logical determination is true, enabling processor read access to said sub-cache line sector at said cache line.

16. The computer memory system as claimed in claim 14, wherein a length of each sub-cache line data sector is an even binary multiple of a cache line length.

17. The computer memory system as claimed in claim 1, wherein each of said plurality of sub-cache line state vectors comprises a 2-bit vector per sub-cache line.

18. The computer memory system as claimed claim 1, wherein each of said cache directory entries further includes:
    address information corresponding to address of said system memory; and
    state information indicating whether data stored in a corresponding cache line is valid and also indicating whether data stored in a corresponding cache line is modified.

19. In a computer memory system including a processor device having associated system memory storage, and a cache memory array device having a plurality of cache lines, each said cache line having a plurality of sub-cache line sectors for storing data; and, a cache line write back means, associated with said cache memory array, for performing a cache line fill operation by requesting and removing existing cache line data and replacing removed data with different data in a cache line write back operation, a method of permitting simultaneous access to sub cache line sectors by said cache line write back means and said processor device, said method comprising the steps of:
    tracking a sub-cache line sector replacement state for independent sub-cache line sector data;
    referencing said sub-cache line sector replacement state when one of the cache line fill operation and the cache line write back operation, or both, are pending; and
    permitting processor access to each sub-cache line sector of the cache line having a sub-cache line sector replacement state indicating logically coherent information content.

20. The method according to claim 19, wherein said tracking step includes the steps of:
    maintaining a plurality of sub-cache line state vectors, each state vector corresponding to an associated sub-cache line sector within a cache line; and
    updating said state of data at said associated sub-cache line sector in accordance with the cache line fill and write back operations.

21. The method according to claim 20, wherein a processor request for data at a cache line results in a cache hit, said step of permitting processor access to each sub-cache line sector during a line fill pending operation includes the steps of:
    determining if address tag information of the processor request matches address tag information of a pending cache line fill address tag; and
    determining if said referenced sub-cache line sector replacement state indicates new data ready for access by the processor request.

22. The method according to claim 20, wherein a processor request for data at a cache line results in a cache miss, said method further including the step of:
    determining if the write back operation is pending; and
    if the write back operation for said cache line is idle, deferring said processor request and initiating performance of said cache line fill and write back operations.

23. The method according to claim 22, wherein said step of permitting processor access to each sub-cache line sector during a write back pending operation includes the steps of:
    during a processor write request, determining if said address tag information of the processor write request matches address tag information of a cache line write back address tag; and determining if said referenced sub-cache line sector replacement state indicates data targeted to be written back to said system memory.

24. The method according to claim 22, wherein said computer memory system implements an inclusive cache policy, said method further including the steps of:

determining if the write back operation is pending, and if the write back operation for said cache line is pending and if said processor request is a read request, deferring the processor request and initiating performance of said cache line fill and write back operations.

25. The method according to claim 22, wherein said computer memory system implements a non-inclusive cache policy, said method further including the steps of:

determining if the write back operation is pending, and if the write back operation for said cache line is pending and if said processor request is a read request;

determining if said address tag information of the processor request matches address tag information of a cache line write back address tag; and determining if said referenced sub-cache line sector indicates that said data is old or has a corresponding copy in said system memory, and, if a logical determination is true, enabling processor read access to said sub-cache line sector at said cache line.

26. A computer memory system including a processor device having associated system memory storage, said computer memory system comprising:

a cache memory array device having a plurality of cache lines, each said cache line having a plurality of sub-cache line sectors for storing data;

a plurality of sub-cache line state vectors, each state vector corresponding to an associated sub-cache line sector within a cache line and indicating a state of data at said associated sub-cache line sector;

a cache line write back system, associated with said cache memory array, for performing a cache line fill operation by requesting and removing existing cache line data and replacing removed data with different data via a cache line write back operation;

a line fill processing state engine for maintaining said state vectors and updating a current state for each associated sub-cache line sector when data from said system memory is transferred to an associated sub-cache line sector during a pending line fill operation;

a write back processing state engine for maintaining said state vectors and updating a current state for each associated sub-cache line sector when data from said sub-cache line sector is transferred to said system memory storage during a pending write back operation; and a cache memory access system for enabling said processor device to access data at sub-cache line sectors of an associated single cache line in accordance with a current status of associated sub-cache line state vectors, said cache memory access system enabling data to be simultaneously written to said sub-cache line sectors and data at said sub-cache line sectors to be read by one of said cache line write back system and said processor device or both without requiring intermediate storage or mutual exclusivity.

* * * * *